United States Patent [19]

Tanahashi et al.

[11] 4,154,201
[45] May 15, 1979

[54] IGNITION TIMING CONTROL DEVICE OF AN INTERNAL COMBUSTION ENGINE WITH AN AUXILIARY COMBUSTION CHAMBER

[75] Inventors: Toshio Tanahashi; Fujio Nakayama, both of Toyota, Japan

[73] Assignee: Toyota Jidosha Kogyo Kabushiki Kaisha, Toyota, Japan

[21] Appl. No.: 791,523

[22] Filed: Apr. 27, 1977

[30] Foreign Application Priority Data

Feb. 18, 1977 [JP] Japan .............................. 52-016081
Feb. 18, 1977 [JP] Japan .............................. 52-016082

[51] Int. Cl.² .............................................. F02P 5/04
[52] U.S. Cl. .............................. 123/117 R; 123/117 A
[58] Field of Search ......... 123/117 A, 117 R, 146.5 A

[56] References Cited

U.S. PATENT DOCUMENTS

| 2,677,946 | 5/1954 | Purdy | 123/117 R |
| 3,482,559 | 12/1969 | Salomon | 123/117 R |
| 3,677,238 | 7/1972 | Harada et al. | 123/117 A |
| 3,688,753 | 9/1972 | Walker | 123/117 A |
| 3,727,596 | 4/1973 | Panhard | 123/117 R |
| 3,800,758 | 4/1974 | Sutherland | 123/117A |
| 3,978,831 | 9/1976 | Yoshikawa | 123/117 R |
| 3,978,832 | 9/1976 | Walker et al. | 123/117 R |
| 3,980,057 | 9/1976 | Sanda et al. | 123/32 SP |
| 4,022,169 | 5/1977 | Tanaka et al. | 123/117 R |
| 4,051,823 | 10/1977 | Mogi et al. | 123/117 A |

FOREIGN PATENT DOCUMENTS

| 2635726 | 2/1977 | Fed. Rep. of Germany | 123/117 A |
| 25247 | 10/1969 | Japan | 123/117 A |
| 27930 | 11/1969 | Japan | 123/146.5 A |

*Primary Examiner*—Ronald H. Lazarus
*Assistant Examiner*—Andrew M. Dolinar
*Attorney, Agent, or Firm*—Stevens, Davis, Miller & Mosher

[57] ABSTRACT

Disclosed is an ignition timing control device of an internal combustion engine provided with an auxiliary combustion chamber. The ignition timing is retarded as compared with a conventional ignition timing when the engine is operating at a high number of revolutions per minute under a light load.

2 Claims, 13 Drawing Figures

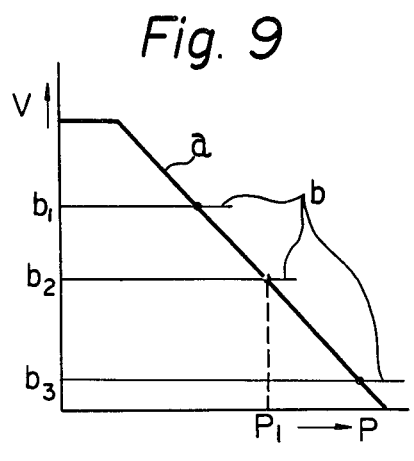
Fig. 9
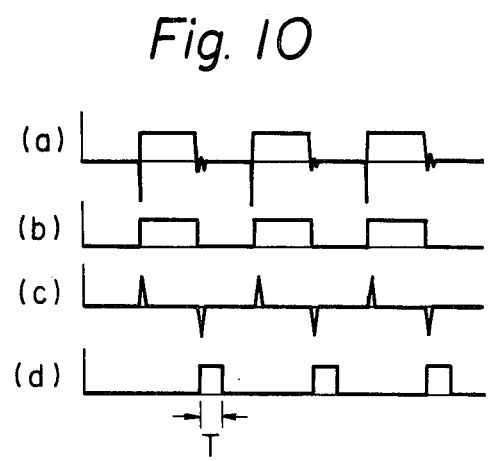
Fig. 10
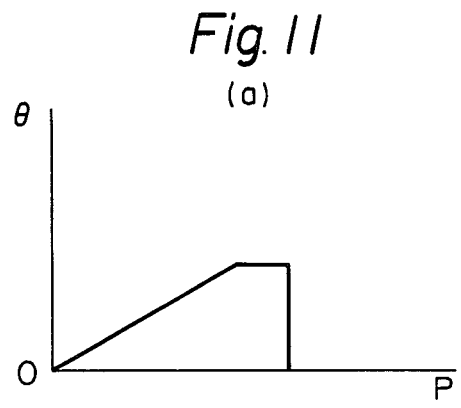
Fig. 11
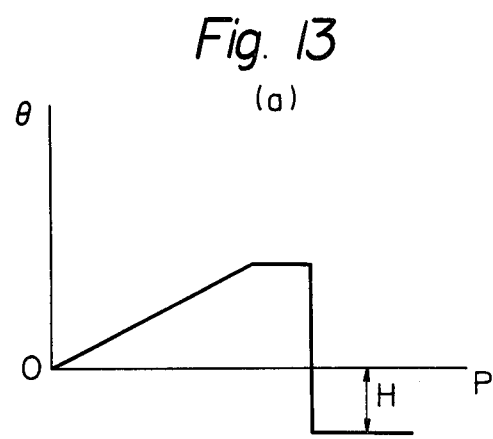
Fig. 13
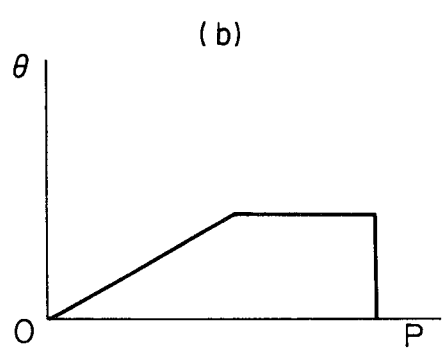
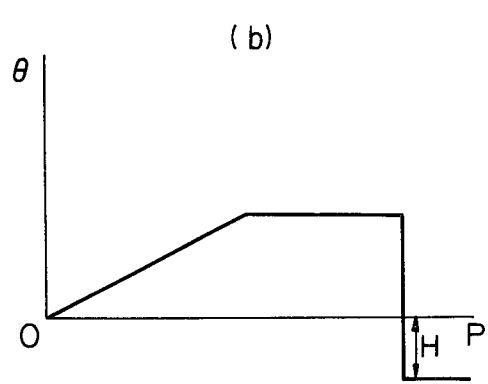

IGNITION TIMING CONTROL DEVICE OF AN INTERNAL COMBUSTION ENGINE WITH AN AUXILIARY COMBUSTION CHAMBER

DESCRIPTION OF THE INVENTION

The present invention relates to an ignition timing control device of an internal combustion engine provided with an auxiliary combustion chamber.

The inventors of the present invention have already proposed an internal combustion engine which is provided with an auxiliary combustion chamber wherein the combustion chamber thereof comprises a main combustion chamber and an auxiliary combustion chamber interconnected with each other by a connecting passage and wherein the spark gap of a spark plug is located in the connecting passage or in the vicinity of the connecting passage. In this engine, a combustible mixture such as, for example, a lean air-fuel mixture or a mixture containing a large amount of the recirculated exhaust gas therein is introduced into the main combustion chamber at the time of the intake stroke. Then, at the time of the compression stroke, the combustible mixture is forced into the auxiliary combustion chamber from the main combustion chamber via the connecting passage. Then, the combustible mixture forced into the auxiliary combustion chamber is ignited by the spark plug; thus, a burning jet is injected into the main combustion chamber from the auxiliary combustion chamber via the connecting passage. Then, the combustible mixture in the main combustion chamber is ignited by the burning jet.

As is shown in FIG. 1, the conspicuous feature of construction of an internal combustion engine of this type resides in that, in order to improve the ignition, the spark gap of the spark plug 28 is located in the connecting passage 26, for example, in the entrance portion of the connecting passage 26 located on the main combustion chamber side, or in the vicinity of the connecting passage 26. Thus, when the combustible mixture in the main combustion chamber 18 is forced into the auxiliary combustion chamber 24 at the time of the compression stroke, the electrode of the spark plug 28 is exposed to the combustible mixture flowing in the connecting passage 26 at a relatively high speed. As a result of this, the residual exhaust gas created by the combustion in the preceeding cycle and remaining in the vicinity of the electrode of the spark plug 28 is scavenged by the combustible mixture and, therefore, ignition can be improved. In such engine, as is mentioned above, it is true that the ignition is improved with regard to the scavenging operation. However, if the velocity of the combustible mixture flowing around the electrode of the spark plug is excessively high, a problem occurs in that the discharging arc created in the spark gap of the spark plug at the time of ignition is extinguished, thus causing a misfire. This misfire can be prevented by determining the cross-sectional area of the connecting passage and the volume of the auxiliary combustion chamber so that the velocity of the combustible mixture flowing around the electrode of the spark plug does not become excessively high. However, actually in order to obtain a good combustion of the engine, the cross-sectional area of the connecting passage and the volume of the auxiliary combustion chamber must be limited within fixed ranges which are determined by various factors such as the maximum number of revolutions of the engine, the maximum vacuum level produced in the intake manifold of the engine, the volume of the combustion chamber, the inner diameter of the cylinder and the stroke of the piston. However, in some engines, the above-mentioned fixed ranges do not correspond to the ranges of the cross-sectional area of the connecting passage and of the volume of the auxiliary combustion chamber, in which ranges the velocity of the combustible mixture flowing around the electrode of the spark plug necessary for obtaining easy ignition can be achieved. Consequently, a misfire sometimes occurs under a particular operating condition of the engine.

The particular operating condition, which brings about a misfire, will be described with reference to FIGS. 2 and 3. FIG. 2 is a graph showing the relationship between the crank angle (that is, the location of the piston) and the velocity of the combustible mixture flowing around the electrode of the spark plug when the engine is operating at a constant speed. In FIG. 2, the ordinate indicates the velocity U(m/sec) of the combustible mixture flowing around the electrode of the spark plug, and the abscissa indicates a crank angle $\theta$. In addition, in FIG. 2, the solid line shows the case wherein the engine is operating at 4000 r.p.m., and the broken line shows the case wherein the engine is operating at 1000 r.p.m. As apparent from FIG. 2, the velocity of the combustible mixture flowing around the electrode of the spark plug is gradually reduced as the piston approaches to the top dead center. Consequently, in an internal combustion engine with an auxiliary combustion chamber of the type as shown in FIG. 1, it is understood that the greater the ignition timing is retarded, the greater the ignition is improved. In addition, as is shown in FIG. 2, the velocity U of the combustible mixture is increased as the engine speed is increased. Consequently, it is understood that the greater the engine speed is reduced, the greater the ignition is improved. Furthermore, as is known to those skilled in the art, when the vacuum level in the intake manifold is low, that is, the greater the level of load of the engine is increased, the greater the ignition is improved. Consequently, the factors having an influence on the ignition are follows.

(I) The greater the ignition timing is retarded, the greater the ignition is improved.

(II) The greater the engine speed is reduced, the greater the ignition is improved.

(III) The greater the vacuum level is decreased, the greater the ignition is improved.

FIG. 3 schematically shows the above three relationships (I), (II) and (III) by using a three-dimensional ordinate. In FIG. 3, the X-axis indicates the number of revolutions of the engine; the Y-axis indicates the vacuum level in the intake manifold; and the Z-axis indicates the advance of the ignition timing. In addition, the origin O of the X-, Y-, Z-axes shows the case wherein the number of revolutions of the engine is equal to that at the time of idling, the vacuum level in the intake manifold is equal to zero, and the advance of the ignition timing is equal to zero.

With regard to the limit of ignition at the time of idling, in order to obtain easy ignition in view of the relationship between the above-mentioned items (I) and (III), it is necessary that the ignition timing be retarded as the vacuum level in the intake manifold is increased. Consequently, the limit of ignition is indicated by the curved line $\overarc{bc}$ in FIG. 3. In FIG. 3, the region capable of ignition is shown by the region Po enclosed by the lines $\overline{oc}$, $\overline{ob}$ and $\overarc{bc}$, while the region causing a misfire is shown by the region P. Similarly, in view of the relationship between the above-mentioned items (I) and (II), the limit of ignition in the case wherein the vacuum level in the intake manifold is equal to zero is indicated by the curved line $\widehat{ac}$ in FIG. 3. In FIG. 3, the region capable of ignition is shown by the region Qo enclosed by the lines $\overline{oa}$, $\overline{oc}$ and $\widehat{ac}$, while the region causing a misfire is shown by the region Q. In addition, similarly, in view of the relationship between the above-mentioned items (II) and (III), the limit of ignition in the case wherein the advance of the ignition timing is equal to zero is indicated by the curved line $\widehat{ab}$ in FIG. 3. In FIG. 3, the region capable of ignition is shown by the region Ro enclosed by the lines $\overline{oa}$, $\overline{ob}$ and $\widehat{ab}$, while the region causing a misfire is shown by the region R. That is to say, the limit of ignition in an internal combustion engine of the type as shown in FIG. 1. is indicated by the curved surface abc defined by the lines $\widehat{ab}$, $\widehat{bc}$ and $\widehat{ac}$. In FIG. 3, if the ordinate showing the operating condition of the engine, which is determined by the number of revolutions of the engine, by the vacuum level in the intake manifold and by the advance of the ignition timing, is located within the space region enclosed by the X-O-Y plane, the X-O-Z plane, the Y-O-Z plane and the curved surface abc, ignition can be carried out for operating the engine. Contrary to this, if the ordinate showing the operating condition of the enigne is located on the outside of the above-mentioned space region, a misfire will occur, thus preventing the engine from operating.

In general in an internal combustion engine, in order to improve the thermal efficiency of the engine, the ignition timing is advanced by an ignition timing control device in accordance with changes in the number of revolutions of the engine and in the vacuum level in the intake manifold. With respect to the number of revolutions of the engine, as is shown by the curved broken line Od in FIG. 3, the advance of the ignition timing is set so that the ignition timing is advanced in accordance with an increase in the number of revolutions of the engine. On the other hand, with respect to the vacuum level in the intake manifold, as is shown by the curved broken line Oe in FIG. 3, the advance of the ignition timing is set so that the ignition timing is advanced in accordance with an increase in the vacuum level in the intake manifold. Consequently, if such an advance of the ignition timing is applied to an internal combustion engine as shown in FIG. 1, it is understood that the ignition timing is advanced beyond the limit of ignition shown by the curved surface abc in FIG. 3 under a certain operating condition of the engine which is determined by the number of revolutions of the engine and by the vacuum level in the intake manifold. That is to say, the above-mentioned advance of the ignition timing used in an internal combustion engine in general, is indicated by the curved surface Ode in FIG. 3, and this curved surface Ode intersects with the curved surface abc showing the limit of ignition on the curved line de. Therefore, if the number of revolutions of the engine and the vacuum level in the intake manifold are increased beyond the level indicated by the curved line de, it will not be possible to carry out the ignition operation.

FIG. 4 shows a view taken along the axis Z in FIG. 3. The curved line de showing the limit of ignition in FIG. 3 is indicated by the curved line $\widehat{d'e'}$ in FIG. 4. In addition, in FIG. 4, the line fh indicates the limit of the maximum number of revolutions of the engine at which the engine can be operated, while the curved line $\widehat{gh}$ indicates the vacuum level in the intake manifold when the throttle valve of the carburetor is in an idling position. When the throttle valve is fully opened, the vacuum level becomes equal to approximately zero. Consequently, the engine is operated under the operating condition within the region, enclosed by the lines $\overline{Of}$, $\widehat{fh}$, $\widehat{hg}$, $\overline{gO}$, of the number of revolutions of the engine and of the vacuum level in the intake manifold. Accordingly, the ignition timing of the engine is determined by an ignition timing control device on the basis of the number of revolutions of the engine and on the basis of the vacuum level in the intake manifold. When the engine is rotating under the operating condition corresponding to the operating condition within the range shown by the hatching in FIG. 4, it is understood that the ignition timing is increased beyond the normal ignition timing period, thereby causing a misfire. Therefore, if the ignition timing control device used in an ordinary engine is applied to an engine as shown in FIG. 1, it is understood that there is a tendency for a misfire to occur when the number of revolutions of the engine is high and when the vacuum level in the intake manifold is also high.

In order to prevent the occurrence of misfire which is caused at the time of a high engine speed and at the time of a high vacuum level as mentioned above, that is, at the time of a high engine speed and of a light load, the ignition timing should be retarded during such time. Retarding the ignition timing corresponds to the downwardly shifting of the curved line $\widehat{de}$ towards the X-O-Y plane in FIG. 3. Consequently, if the curved line $\widehat{de}$ is shifted downwards towards the X-O-Y plane in FIG. 3, the curved line $\widehat{d'e'}$ in FIG. 4 showing the limit of ignition is shifted to the position indicated by the curved line $\widehat{d''e''}$ and successively to the position indicated by the curved line $\widehat{d'''e'''}$ so as to be away from the region, enclosed by the lines $\overline{Of}$, $\widehat{fh}$, $\widehat{hg}$, $\overline{gO}$, thereby showing the operating condition under which the engine is being operated. As a result of this, the engine can operate without having any misfire occurring over the entire range of the operating condition corresponding to the region enclosed by the lines $\overline{Of}$, $\widehat{fh}$, $\widehat{hg}$, $\overline{gO}$ in FIG. 4.

However, if the ignition timing is merely retarded, that is, if the initial setting value of the ignition timing, which is used as a reference timing, is merely retarded while leaving centrifugal and vacuum advances unchanged, when the engine is operating at a low speed or under a heavy load, the ignition timing will be retarded relative to the optimum ignition timing. This condition results in a disadvantage in that the thermal efficiency of the engine is decreased. Contrary to this, if the ignition timing is set so as to have a tendency which is reverse to the conventional tendency of the ignition timing, that is, if the ignition timing is set so as to be retarded in accordance with an increase in the number of revolutions of the engine or with an increase in the vacuum level in the intake manifold, then the occurrence of misfire can be effectively prevented. However, if the ignition timing is set so as to have the above-mentioned reverse tendency, the ignition timing is excessively advanced or retarded from the optimum ignition timing. Consequently, when the engine is operating at a low speed or under a heavy load, the ignition timing is extremely advanced, thus disadvantageously causing the thermal efficiency of the engine to be decreased and knocking to occur.

An object of the present invention is to provide an ignition timing control device of an internal combustion engine provided with an auxiliary combustion chamber, which is capable of retarding the ignition timing as compared with a conventional ignition timing only when the engine is operating at a high speed and under a light load.

According to the present invention, there is provided an ignition timing control device of an internal combustion engine for retarding the ignition timing when the speed of the engine is increased beyond a predetermined high number of revolutions per minute and when the load of the engine is lower than a predetermined light load. This engine has an intake passage, an air-fuel mixture forming device disposed in the intake passage, a main combustion chamber, an auxiliary combustion chamber, a connecting passage communicating the main combustion chamber with the auxiliary combustion chamber, and a spark plug located in the region which includes the inside of the connecting passage and the insides of the main and auxiliary combustion chambers located near the connecting passage. The above-mentioned ignition timing control device comprises in combination, a distributor for feeding intermittent spark energy into the spark plug, a centrifugal-advance mechanism located in the distributor for advancing the ignition timing in accordance with changes in the number of revolutions of the engine, a vacuum-advance mechanism connected to the distributor and having a diaphragm apparatus provided with a vacuum chamber for advancing the ignition timing in accordance with changes in the vacuum level in the vacuum chamber, and a vacuum-advance mechanism control means for controlling the vacuum level in the vacuum chamber.

The present invention may be more fully understood from the following description of preferred embodiments of the invention, together with the accompanying drawings.

BRIEF DESCRIPTION OF THE DRAWINGS

In the drawings:

FIG. 9 is a graph showing the changes of the input voltage of the logic amplifier shown in FIG. 8;

FIG. 10 exhibits graphs showing the pulses generated in the electrical circuit in FIG. 8;

FIG. 11 exhibits graphs showing the advance of the ignition timing caused by the ignition timing control device shown in FIG. 8;

DESCRIPTION OF PREFERRED EMBODIMENTS

Figure 1:
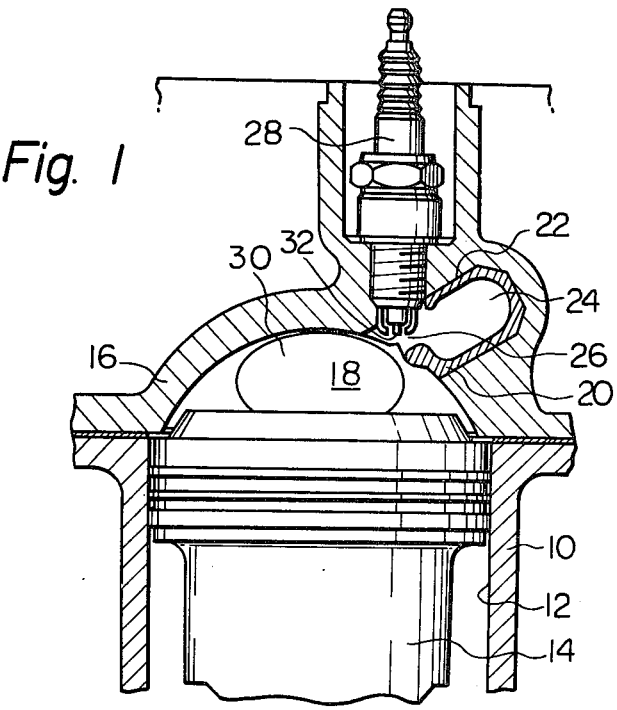
FIG. 1 is a cross-sectional side view of an internal combustion engine.
Figure 2:
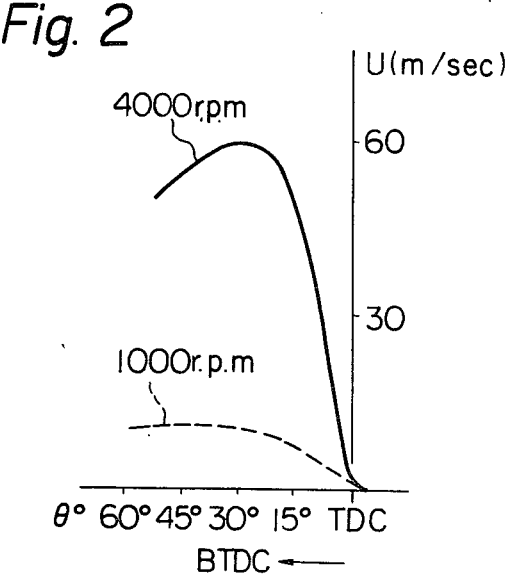
FIG. 2 is a graph showing the relationship between the crank angle and the velocity of the combustible mixture flowing in the connecting passage.
Figure 3:
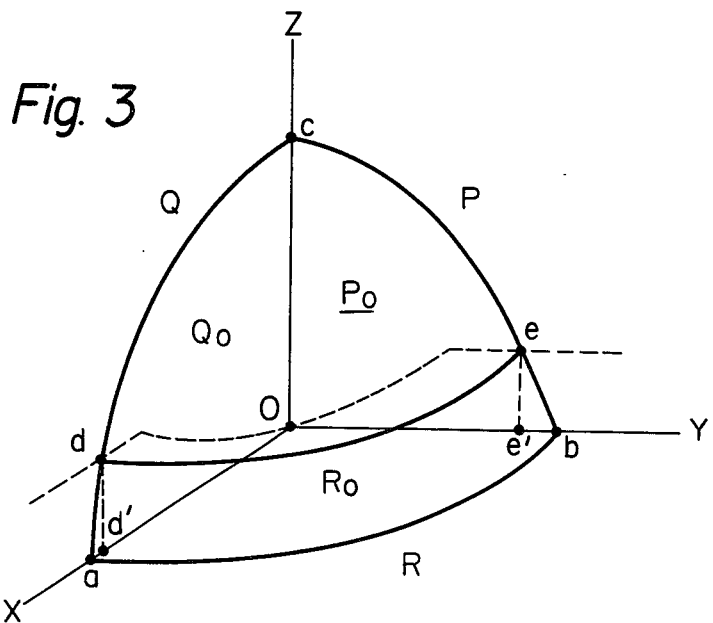
FIG. 3 is an illustrative diagram showing the time limit of the ignition in the engine shown in FIG. 1.

FIG. 1 shows a cross-sectional side view of an internal combustion engine equipped with an ignition timing control device according to the present invention. In FIG. 1, 10 designates a cylinder block, 12 a cylinder bore formed in the cylinder block 10, 14 a piston reciprocally movable in the cylinder bore 12, 16 a cylinder head fixed onto the cylinder block 10, 18 a main combustion chamber formed between the inner wall of the cylinder head 16 and the top surface of the piston 14, 20 an auxiliary chamber component press-fitted into a recess 22 formed in the cylinder head 16, 24 an auxiliary combustion chamber formed in the auxiliary chamber component 20, 26 a connecting passage communicating the auxiliary combustion chamber 24 with the main combustion chamber 18, 28 a spark plug, and 30 an intake valve. The electrode 32 of the spark plug 28 is located in the connecting passage 26. However, the spark plug 28 may be arranged so that its electrode 32 is located in the auxiliary combustion chamber 24 or in the main combustion chamber 18 in the vicinity of the connecting passage 26.

At the time of the intake stroke, a lean air-fuel mixture or a mixture containing a large amount of the recirculated exhaust gas therein is introduced into the main combustion chamber 18 via the intake valve 30. Then, at the time of the compression stroke, the combustible mixture is forced into the auxiliary combustion chamber 24 from the main combustion chamber 18 via the connecting passage 26. The combustible mixture forced into the auxiliary combustion chamber 24 is ignited by the spark plug 28 and, then, a burning jet is injected into the main combustion chamber 18 from the connecting passage 26, whereby the combustible mixture in the main combustion chamber 18 is ignited by the burning jet to start the burning process.

Figure 5:
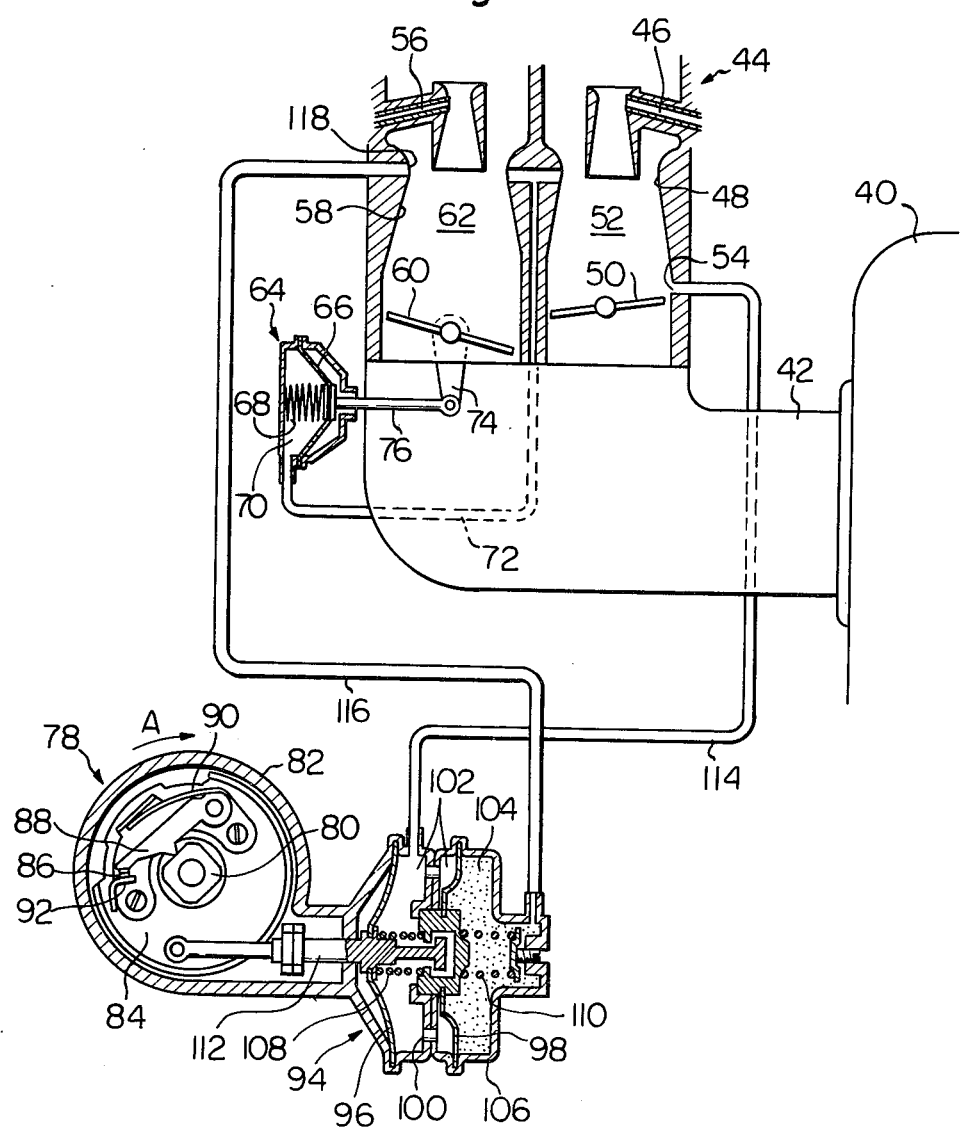
FIG. 5 is a schematic view of an embodiment of an ignition timing control device according to the present invention.

FIG. 5 shows an ignition timing control device according to the present invention. In FIG. 5, 40 is an engine body having the same construction as that shown in FIG. 1, 42 an intake manifold, 44 a two-barrel type carburetor, 46 a primary main nozzle, 48 a primary venturi, 50 a primary throttle valve, 52 a primary intake passage, 54 an advance port, 56 a secondary main nozzle, 58 a secondary venturi, 60 a secondary throttle valve, and 62 a secondary intake passage. The advance port 54 is arranged so as to be opened into the primary intake passage 52 at a position located upstream of the primary throttle valve 50 when the throttle valve 50 is in the idling position, and into the secondary intake passage 52 at a position downstream of the primary throttle valve 50 so that the vacuum level at the advance port 54 is equal to that in the intake manifold 42 when the primary throttle valve 50 is opened to a predetermined extent. A diaphragm apparatus 64 comprises a diaphragm 66, a compression spring 68 and a vacuum chamber 70. This vacuum chamber 70 is connected to the primary and the secondary venturis 48 and 58 via a conduit 72. On the other hand, an arm 74 is rigidly fixed onto the secondary throttle valve 60, and the lower end of the arm 74 is connected to the diaphragm 66 via a rod 76. When the primary throttle valve 50 is opened to a great extent and the engine is operating at a high number of revolutions per minute, that is, when a large amount of mixture is flowing in the primary venturi 48, a large vacuum is produced in the venturi 48. Accordingly, a large vacuum is produced in the vacuum chamber 70 of the diaphragm apparatus 64; thus, the diaphragm 66 moves towards the left in FIG. 5. As a result of this, the secondary throttle valve 60 is opened, whereby a large amount of fuel is fed into the cylinder of the engine from the primary and the secondary main nozzles 46 and 56, respectively.

Reference numeral 78 designates a distributor. This distributor 78 comprises a cam 80 rotating in the direction A at a number of revolutions which is half of the number of revolutions of the engine, a breaker plate 84 pivotably arranged in the distributor housing 82, and a breaker arm 88 pivotably mounted on the breaker plate 84 and having a breaker-point 86. This breaker arm 88 is urged onto the cam 80 due to the spring force of the spring 90. As is known to those skilled in the art, rotation of the cam 80 causes the breaker arm 88 to rotate outwards in the clockwise direction. As a result of this, when the contact between the breaker-point 86 and a stationary point 92 is broken, a high voltage is produced in the secondary winding coil of the ignition coil (not shown). This results in a spark being generated in the spark gap of the spark plug 28 (FIG. 1), whereby the combustible mixture in the auxiliary combustion chamber 24 (FIG. 1) is ignited.

The distributor 78 further comprises a vacuum-advance mechanism 94. This vacuum-advance mechanism 94 has in its housing 106 a pair of diaphragms 96 and 98, first vacuum chambers 102 interconnected with each other via a restricted opening 100, and a second vacuum chamber 104. In addition, compression springs 108 and 110 are disposed between the diaphragms 96 and 98 and between the diaphragm 98 and the housing 106, respectively. One end of an advance rod 112 fixed onto the diaphragm 96 is pivotably mounted on the breaker plate 84, while the other end of the advance rod 112 is loosely connected to the diaphragm 98 as shown in FIG. 5. The first vacuum chamber 102 is connected to the advance port 54 via a vacuum conduit 114. On the other hand, the second vacuum chamber 104 is connected to a vacuum port 118 opening into the secondary venturi 58 via a vacuum conduit 116. In FIG. 5, the ignition timing is advanced as the breaker plate 84 is rotated in the counterclockwise direction.

Assuming that the primary throttle valve 50 remains opened and the secondary throttle valve 10 remains closed, the pressure in the second vacuum chamber 104 of the vacuum-advance mechanism 94 is approximately equal to atmospheric pressure. As a result, the diaphragm 98 is urged towards the furthermost left hand side position in FIG. 5 due to the spring force of the compression spring 110. On the other hand, since a vacuum is produced in the primary vacuum chamber 102, the diaphragm 96 moves towards the right in FIG. 5. As a result of this, the breaker plate 84 is rotated in the counterclockwise direction, whereby the ignition timing is advanced.

Assuming that the primary throttle valve 50 remains fully opened and the secondary throttle valve 60 remains partially opened, whereby the engine is operating under a heavy load and at a high speed, a large vacuum is produced in the secondary venturi 58 and, accordingly, a greater vacuum is produced in the second vacuum chamber 104. On the other hand, since the primary throttle valve 50 remains fully opened, the pressure in the first vacuum chamber 102 is approximately equal to atmospheric pressure. Consequently, the diaphragm 98 moves towards the right in FIG. 5; as a result, the ignition timing is advanced.

Figure 6:
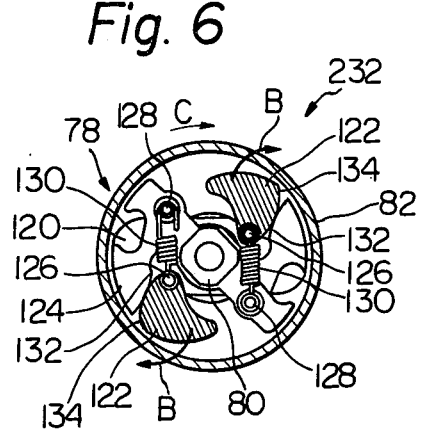
FIG. 6 is a plan view of a centrifugal-advance mechanism.

FIG. 6 shows a centrifugal-advance mechanism arranged in the distributor housing 82 at a position located beneath the breaker plate 84 shown in FIG. 5. This centrifugal-advance mechanism comprises a governor plate 120 connected to the crankshaft (not shown) of the engine and rotating at a number of revolutions which is half of the number of revolutions of the crankshaft, a pair of centrifugal weights 122 pivotably mounted on the governor plate 120 by pivot pins 126, and a governor cam 124 mounted rotatably on the governor plate 120 relative to the governor plate 120. The cam 80 shown in FIG. 5 is fixed onto the governor cam 124. A pair of pins 128 is fixed onto the governor cam 124, and a pair of tension springs 130 is disposed between the pins 128 and the pivot pins 126. The cam faces 132 of the governor cam 124 are always in contact with the cam faces 134 of the centrifugal weights 122. The centrifugal weights 122 are rotated in the direction B due to the centrifugal force as the number of revolutions of the engine, that is, the number of revolutions of the governor plate 120 is increased. As a result of this, the governor cam 124 is rotated in the direction C relative to the governor plate 120, whereby the ignition timing is advanced. The relationship between the advance of the ignition timing and the number of revolutions of the governor plate 120 can be set at will by changing the profiles of the cam faces 134 of the centrifugal weights 122.

Figure 7:
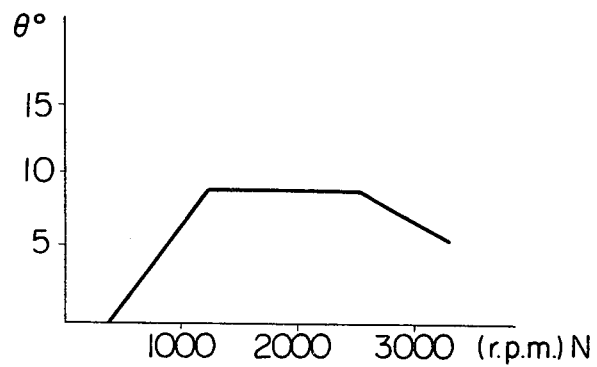
FIG. 7 is a graph showing the advance of the ignition timing caused by the centrifugal-advance mechanism.

Referring to FIG. 7, the ordinate indicates the advance $\theta°$ of the ignition timing, and the abscissa indicates the number of revolutions N (r.p.m.) of the governor plate 120 (FIG. 6). According to the present invention, the profile of the cam faces 132 (FIG. 6) of the centrifugal weights 122 is so set that the advance $\theta°$ is maintained at a constant level when the governor plate 120 (FIG. 6) is rotating from about 1200 r.p.m. to about 2500 r.p.m. and, that the advance $\theta°$ of the ignition timing is gradually reduced as the number of revolutions of the governor plate 120 is increased in the case wherein the governor plate 120 is rotating at more than 2500 r.p.m, that is, wherein the engine is operating at more than 5000 r.p.m.

Assuming that the engine is operating under a heavy load and at a high speed, as is hereinbefore mentioned with reference to FIG. 5, the ignition timing is advanced due to vacuum produced in the second vacuum chamber 104. On the other hand, at this time, the ignition timing controlled by the centrifugal operation of the centrifugal weights 122 is retarded as is shown in FIG. 7. Consequently, when the engine is operating under a heavy load and at a high speed, the advance of the ignition timing caused by the vacuum-advance mechanism and the retardation of the ignition timing caused by the centrifugal-advance mechanism cancel each other. As a result, an ignition timing the same as the conventional ignition timing can be obtained.

Contrary to this, when the engine is operating under a light load and at a high speed, as is hereinbefore mentioned with reference to FIG. 5, the pressure in the second vacuum chamber 104 is approximately equal to atmospheric pressure. Consequently, in this case, the ignition timing is controlled by the vacuum level in the first vacuum chamber 102 in the some way as that of a conventional ignition timing control device. However, at this particular time, since the number of revolutions of the engine is high, the ignition timing controlled by the centrifugal-advance mechanism is retarded. As a result of this, the ignition timing determined by the total advances of the vacuum-advance and of the centrifugal-advance is retarded when compared with that of the conventional ignition timing.

In addition, even if the vehicle is decelerated while being driven at a high speed, since the ignition timing is retarded due to the centrifugal operation of the centrifugal weights, there is no danger that a misfire will be caused. Furthermore, in this case, instead of receiving the ignition signal by a mechanical means using a contact breaker, the ignition signal may be received electrically as in a full-transistor ignition system. In addition, as a method for generating a spark, a high energy continuous spark system can be used. Furthermore, it is necessary that the centrifugal-advance curve shown in FIG. 7 be changed to an optimum curve determined by the various factors such as the type of engine, the ratio of the volume of the main combustion chamber to the volume of the auxiliary combustion chamber, the ratio of the cross-sectional area of the connecting passage to the volume of the auxiliary combustion chamber, and the location of the spark plug.

Figure 8:
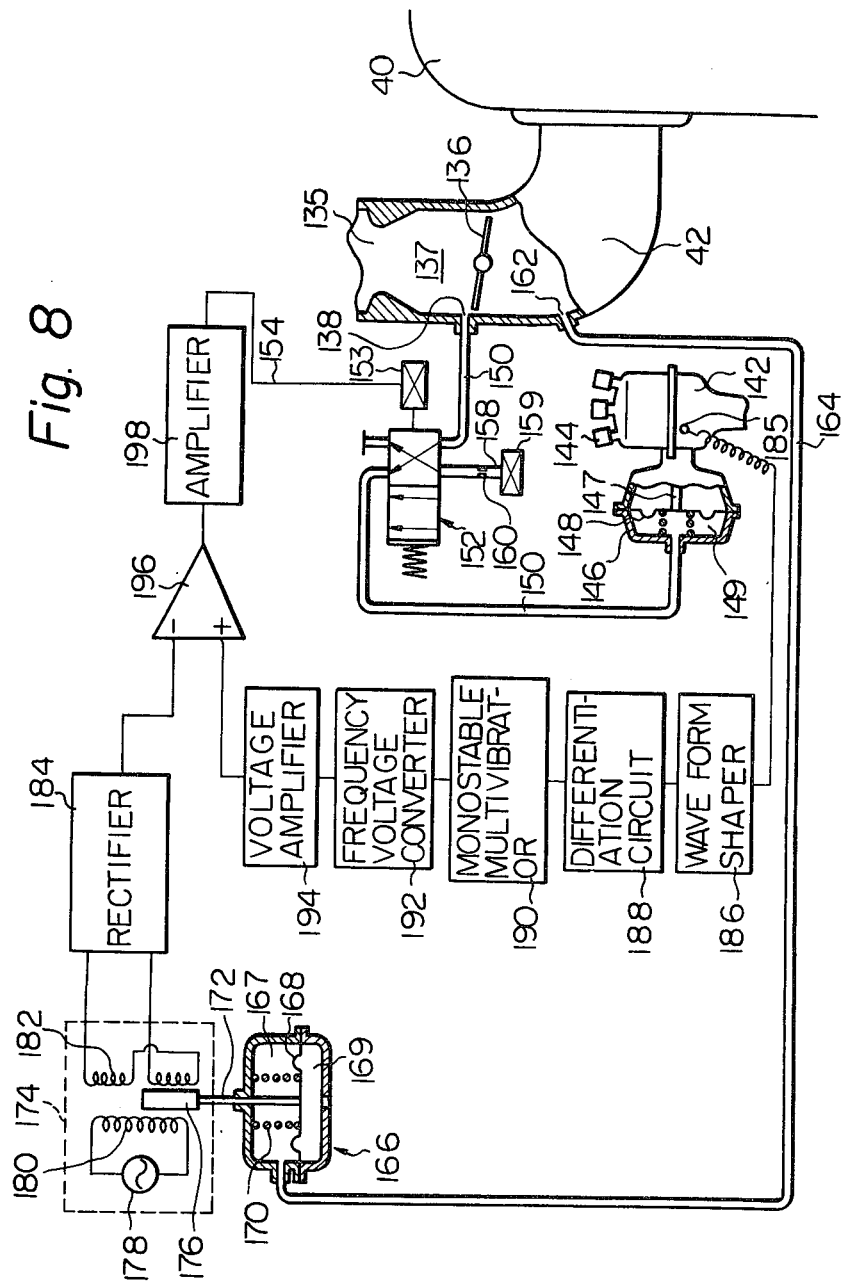
FIG. 8 is a schematic view of another embodiment according to the present invention.

FIG. 8 shows another embodiment of an ignition timing control device according to the present invention. In FIG. 8, 40 designates an engine body having a construction shown in FIG. 1, 42 an intake manifold, 135 a carburetor, 136 a throttle valve, and 138 an advance port. The advance port 138 is arranged so as to open into an intake passage 137 located upstream of the throttle valve 136 when the throttle valve 136 is in the idling position, and to open into the intake passage 137 located downstream of the throttle valve 136 when the throttle valve 136 is opened to a predetermined extent. As is shown in FIG. 8, in this embodiment, a single barrel type carburetor is used. However, instead of using this, a two-barrel type carburetor as shown in FIG. 5 can be used. Reference numeral 142 designates a distributor of a conventional construction, which comprises high tension terminals 144, a vacuum-advance mechanism 146, and a contact breaker (not shown). The vacuum-advance mechanism 146 comprises a diaphragm 148 connected to an advance rod 147, and a vacuum chamber 149. The vacuum chamber 149 is connected to the advance port 138 via a conduit 150 and an electromagnetic switching valve 152. A solenoid 153 of the electromagnetic switching valve 152 is connected to an amplifier 198 via a power supply wire 154. When the solenoid 153 is energized, the vacuum chamber 149 of the vacuum-advance mechanism 146 is connected to the atmosphere via the conduit 150, the electromagnetic switching valve 152, a conduit 158, a restricted opening 160 and an air filter 159. As a result of this, the pressure in the vacuum chamber 149 becomes equal to the atmospheric pressure. On the other hand, when the solenoid 153 is de-energized, the electromagnetic switching valve 152 is switched to the position shown in FIG. 8; thus, the vacuum chamber 149 is connected to the advance port 138. As a result of this condition, if the throttle valve 136 is opened, a vacuum is produced in the vacuum chamber 149.

A diaphragm apparatus 166 comprises a diaphragm 168, a vacuum chamber 167, an atmospheric pressure chamber 169, a compression spring 170, and a control rod 172 connected to the diaphragm 168. The vacuum chamber 167 of the diaphragm apparatus 166 is connected a vacuum port 162 opening into the intake manifold 42 via a conduit 164; thus, a vacuum is produced in the vacuum chamber 167. The diaphragm apparatus 166 is so constructed that the movement of the control rod 172 is changed in accordance with a change in the vacuum produced in the vacuum chamber 167. The upper end of the control rod 172 is connected to a core 176 of a differential transformer 174 which is functioning as a mechanical-electrical converting means. As is known to those skilled in the art, the differential transformer 174 includes a power source 178, a primary winding 180 and a secondary winding 182 in addition to the core 176. Furthermore, the voltage is excited in the secondary winding 182 in accordance with an amount of movement of the core 176. The output of the differential transformer 174 is converted to a direct current voltage by means of an alternating current-direct current (AC-DC) converter 184, that is, a rectifier which comprises, for example, silicon diodes. The output of the rectifier 184 is connected to the inverting input terminal of an operational amplifier 196 functioning as a comparative means.

On the other hand, the intermittent signal originating from the contact breaker of the distributor 142 appears on an output terminal 185 and is applied to a wave-form shaper 186. The output signal of the wave-form shaper 186 is applied to a differentiation circuit 188. Then, the output signal of the differentiation circuit 188 is applied to a monostable multivibrator 190. The output signal of the monostable multivibrator 190 is applied to a frequency-voltage converter 192. The frequency-voltage converter 192 contains therein, for example, a resistor and a condenser charged with electrons by the output pulse of the monostable multivibrator 190, the resistor and condenser determining the time constant which, in turn, determines the length of the discharging time of the condenser. This frequency-voltage converter 192 produces the output voltage in accordance with the frequency of the signal applied to the input side of the frequency-voltage converter 192. Accordingly, the construction of the frequency-voltage converter of this type has been well known.

The output signal of the frequency-voltage converter 192 is applied to the non-inverting input terminal of the operational amplifier 196 via a voltage amplifier 194 used for regulating the voltage level. The output signal of the operational amplifier 196 is applied to the amplifier 198, and the switching operation of the electromagnetic switching valve 152 is controlled by the output signal of the amplifier 198.

The ignition timing control device shown in FIG. 8 is operated as follows. When the engine is started, a vacuum is produced in the vacuum chamber 167 of the diaphragm apparatus 166, and the upward and downward movements of the control rod 172 is controlled in accordance with the vacuum level in the vacuum chamber 167. As a result of this, the core 176 fixed onto the upper end of the control rod 172 moves upwardly or downwardly; thus, the output voltage excited in the secondary winding 182 is changed in accordance with the vacuum level in the intake manifold 42. Then, the output voltage of the secondary winding 182 is converted into the direct current voltage by means of the rectifier 184 and is then applied to the inverting input terminal of the operational amplifier 196. As is shown by the curved line a in FIG. 9, the relationship between the input voltage V applied to the inverting input terminal of the operational amplifier 196 and the vacuum level P produced in the intake manifold 42 is so determined that the input voltage V is decreased as the vacuum level P is increased. The above-mentioned relationship can be easily obtained by appropriately designing the diaphragm apparatus 166 and the differential transformer 174.

On the other hand, the intermittent signal received from the output terminal 185 of the distributor 142 is as shown in FIG. 10(a). This intermittent signal is shaped as shown in FIG. 10(b) by means of the wave-form shaper 186. Then, the differentiating operation of the intermittent signal thus shaped is effected by means of the differentiation circuit 188. In addition, as is shown in FIG. 10(c), the differentiation circuit 188 alternately produces minute positive pulses and minute negative pulses in response to the steeply rising motion and the steeply falling motion of the pulse shown in FIG. 10(b). The monostable multivibrator 190 produces a pulse signal having a constant width of T as shown in FIG. 10(d) when triggered by the minute negative pulses of the differentiation circuit 188. Consequently, it is understood that the monostable multivibrator 190 produces a pulse signal having a constant width and having a frequency proportional to that of the intermittent signal from the distributor 142, that is, proportional to the number of revolutions of the engine. The pulse signal produced in the monostable multivibrator 190 is converted to a voltage signal having a voltage level proportional to the frequency of the pulse signal by means of the frequency-voltage converter 192 containing a charging and discharging circuit therein. Then, the voltage signal produced in the frequency-voltage converter 192 is applied to the non-inverting input terminal of the operational amplifier 196 after the voltage level of the voltage signal is regulated in the voltage amplifier 194. Consequently, as is shown by the straight lines $b_1$, $b_2$ and $b_3$ in FIG. 9, the voltage signal applied to the non-inverting input terminal reaches a high level as shown by $b_1$ when the engine is operating at a high speed, while the voltage signal applied to the non-inverting input terminal reaches a low level $b_2$ and, successively, reaches a low level $b_3$ as the engine speed is decreased.

Figure 4:
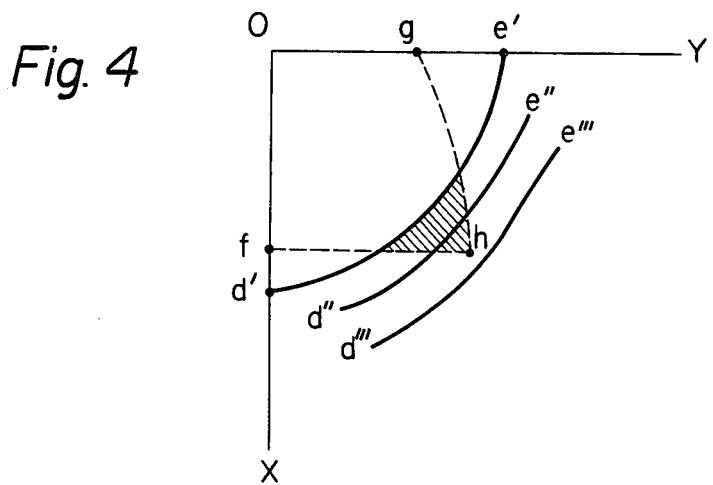
FIG. 4 is a diagram showing the time limit of the ignition, taken along the Z-axis is FIG. 3.

The operational amplifier 196 produces an output signal of a high level when the value obtained by subtracting the input voltage of the inverting input terminal 45 of the operational amplifier 196 from the input voltage of non-inverting input terminal thereof is positive, while the operational amplifier 196 produces an output of a low level when the above-mentioned value obtained by subtraction is negative. That is to say, in FIG. 9, when the output voltage:b: of the voltage amplifier 194 is increased beyond the output voltage:a: of the rectifier 184, the operational amplifier 196 produces an output signal of a high level. On the other hand, when the output voltage:b: of the voltage amplifier 194 is decreased below the output voltage:a: of the rectifier 184, the operational amplifier 196 produces an output of a low level. Consequently, for example, when the output voltage:b: indicating the number of revolutions of the engine is equal to $b_2$, if the vacuum level P in the intake manifold 42 is greater than $P_1$, the operational amplifier 196 will produce an output of a high level. As understood from FIG. 9, the number of revolutions of the engine by which the operational amplifier 196 produces an output signal of a high level is reduced as the vacuum level in the intake manifold 42 is increased, while the vacuum level in the intake manifold 42 by which the operational amplifier 196 produces an output signal of a low level is decreased as the number of revolutions of the engine is increased. Consequently, it is understood that the operational amplifier 196 produces an output signal of a high voltage when the engine is rotating under the operating condition within the region shown by the hatching in FIG. 4.

Referring again to FIG. 8, when the operational amplifier 196 produces an output of a high level, an electrical current is fed into the solenoid 153 of the electromagnetic switching valve 152 from the amplifier 198 via the power supply wire 154. As a result of this, since the solenoid 153 is energized, the electromagnetic valve 152 is switched so that the vacuum chamber 149 of the vacuum-advance mechanism 146 is connected to the atmosphere via the conduits 150, 158, the restricted opening 160 and the air filter 159. Consequently, when the engine is rotating under the operating condition within the region, shown by the hatching in FIG. 4, in which misfire is caused, the pressure in the vacuum chamber 149 will always be equal to the atmospheric pressure. As a result, the vacuum-advance of the ignition timing is equal to zero. Contrary to this, when the engine is rotating under the operating condition within the region enclosed by the lines Od', d'e' and Oe' in FIG. 4, the operational amplifier 196 will produce an output signal of a low level. As a result of this, the electromagnetic switching valve 152 is so operated that the vacuum chamber 149 is connected to the advance port 138, thereby obtaining an ignition timing which is the same the conventional one. Consequently, the ignition timing is as shown in FIG. 11(a) when the engine is operating at a high speed, while the ignition timing is as shown in FIG. 11(b) when the engine is operating at a low speed. In FIG. 11, the ordinate indicates the advance $\theta$ of the ignition timing, and the abscissa indicates the vacuum level P in the intake manifold 42. It is understood from FIG. 11 that the ignition timing is retarded compared with the conventional ignition timing when the engine is operating at a high speed and under a light load.

Although the initial object of the present invention can be accomplished by utilizing the ignition timing control device shown in FIG. 8, a satisfactory ignition timing control device is still yet to be obtained. That is, the distributor 142 is provided with the centrifugal-advance mechanism as shown in FIG. 6 in addition to the vacuum-advance mechanism 146, and it is preferable that the advancing operation caused by the centrifugal-advance mechanism be stopped when the engine is operating at a high speed and under a light load. However, this can not be carried out in the embodiment shown in FIG. 8. In addition, when the throttle valve 136 is in the idling position, for example, when the vehicle is being decelerated, the advance port 138 opens into the intake passage 137 at a position located upstream of the throttle valve 136. Consequently, at this particular time, even if the electromagnetic switching valve 152 is so operated that the vacuum chamber 149 of the vacuum-advance mechanism 146 is connected to the advance port 138, the pressure in the vacuum chamber 149 is approximately equal to atmospheric pressure and, thus, the vacuum advance of the ignition timing is equal to zero. In order to prevent the occurrence of misfire, it is preferable that the ignition timing be retarded when the vehicle is being decelerated. However, this retardation of the ignition timing can not be carried out in the embodiment shown in FIG. 8.

Figure 12:
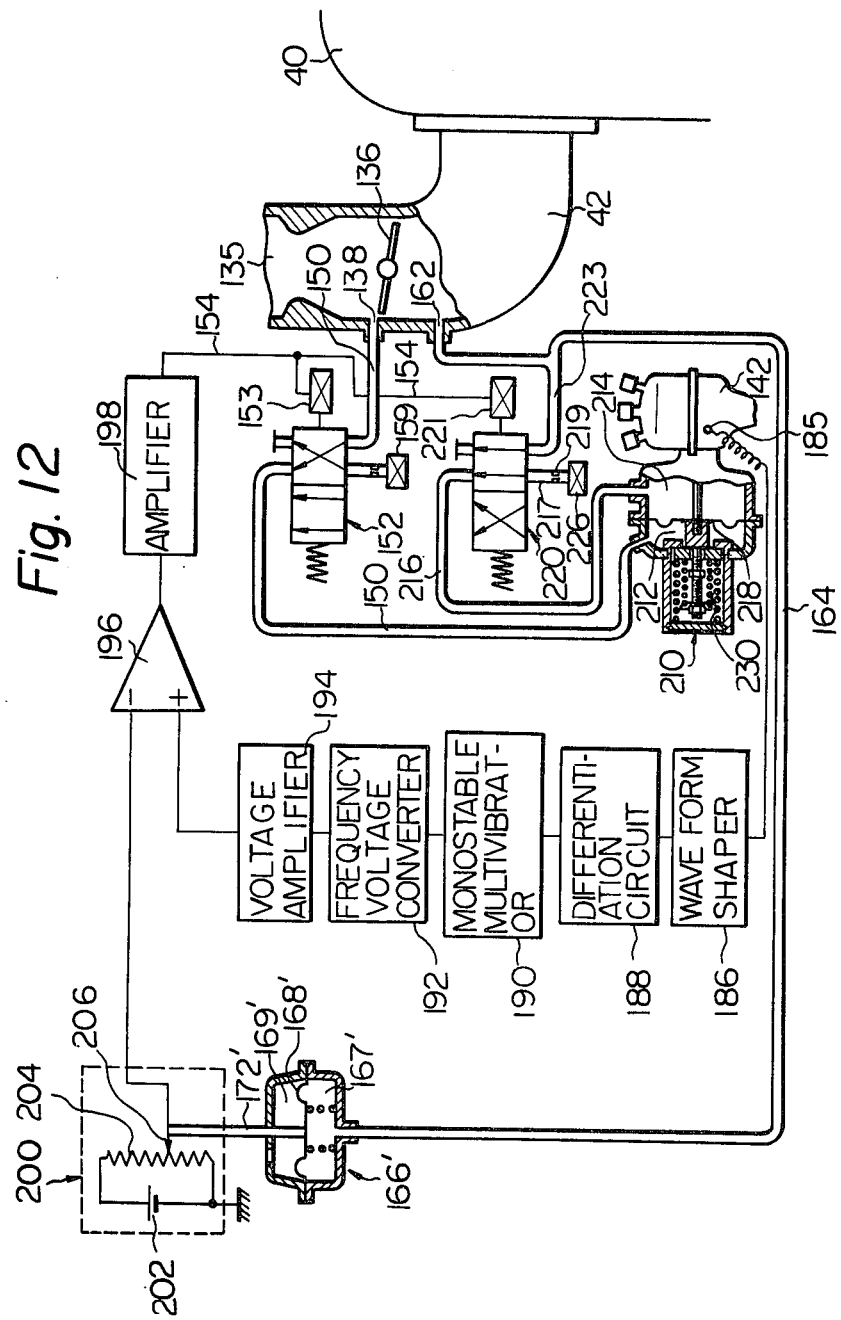
FIG. 12 is a schematic view of a further embodiment according to the present invention, and FIG. 13 exhibits graphs showing the advance of the ignition timing caused by the ignition timing control device shown in FIG. 12.

FIG. 12 shows a further embodiment of an ignition timing control device in which the above-mentioned disadvantages are eliminated. In FIG. 12, similar components are indicated with the same reference numerals as those in FIG. 8. In this embodiment, instead of using a differential transformer, a potentiometer device 200 comprising a direct current source 202, a resistance 204 and a movable contact 206 is used as a mechanical-electrical converting means. The movable contact 206 of the potentiometer device 200 is connected to a control rod 172' of a diaphragm apparatus 166'. This diaphragm apparatus 166' comprises a vacuum chamber 167' and an atmospheric pressure chamber 169', both of which are separated by a diaphragm 168'. The vacuum chamber 167' is connected to the vacuum port 162 via the conduit 164. On the other hand, the control rod 172' is connected to the diaphragm 168' and, thus, the upward or downward movement of the control rod 172' is controlled in accordance with a change in the vacuum level in the intake manifold 42. In the same way as that of the embodiment shown in FIG. 8, the output voltage of the potentiometer device 200, that is, the input voltage of the inverting input terminal of the operational amplifier 196 is decreased as the vacuum level in the intake manifold 42 is increased, as is shown by the lines a in FIG. 9. In addition, since the potentiometer device 200 produces a direct current output, it is not necessary to provide the rectifier 184 shown in FIG. 8. However, in this embodiment, the differential transformer 174 as shown in FIG. 8 may be used. The embodiment shown in FIG. 12 is essentially different from the embodiment shown in FIG. 8 in the following points wherein, instead of using the vacuum-advance mechanism 146 shown in FIG. 8, the ignition timing control device is provided with a so-called vacuum advance-retardation mechanism 210 comprising a vacuum chamber 212 on the advance side and a vacuum chamber 214 on the retardation side, which are separated by a diaphragm 218, and wherein the ignition timing control device is provided with a second electromagnetic switching valve 220 for connecting the vacuum chamber 214 to either the atmosphere or the vacuum port 162 depending on the switching operation of the electromagnetic switching valve 220. A solenoid 221 of the second electromagnetic switching valve 220 is connected to the amplifier 198 via the power supply wire 154. The second electromagnetic switching valve 220 is usually in the position shown in FIG. 12. Therefore, at this time, the vacuum chamber 214 on the retardation side is connected to the atmosphere via conduits 216, 217, a restricted opening 219 and an air-filter 226. On the other hand, when the solenoid 221 is energized, the electromagnetic switching valve 220 is operated so that the vacuum chamber 214 on the retardation side is connected to the vacuum port 162 via the conduits 216 and 223. As a result of this, a vacuum is produced in the vacuum chamber 214 on the retardation side.

The above-mentioned vacuum advance-retardation mechanism 210 has been used in mass-produced engines. For example, the construction of a vacuum advance-retardation mechanism is disclosed in U.S. Pat. No. 2,087,339.

The ignition timing control device shown in FIG. 12 is operated as follows. In this embodiment, the operating condition of the engine in which the operational amplifier 196 produces an output signal of a high level is the same as that described in FIG. 8. When the operational amplifier 196 produces an output signal of a high level, the solenoids 153, 221 of the electromagnetic switching valves 152, 220 are energized. As a result of this, the pressure in the vacuum chamber 212 on the advance side becomes equal to the atmospheric pressure, in the same manner as that described in FIG. 8. At the same time, a vacuum is produced in the vacuum chamber 214 on the retardation side. Consequently, in this particular case, the advance of the ignition timing caused by the vacuum in the vacuum chamber 212 of the advance side is stopped. At the same time, the diaphragm 218 moves towards the retardation side (that is, towards the right in FIG. 12) due to the vacuum in the vacuum chamber 214 of the retardation side. Thus, when the engine is operating at a high speed and under a light load, the ignition timing is greatly retarded when compared with the conventional ignition timing.

On the other hand, when the operational amplifier 196 produces an output pulse of a low level, the solenoids 153, 221 of the electromagnetic switching valves 152, 220 are de-energized. As a result of this, a vacuum is produced in the vacuum chamber 212 of the advance side, while the pressure in the vacuum chamber 214 of the retardation side is equal to atmospheric pressure. Consequently, in this case, the ignition timing is the same as the conventional ignition timing.

Therefore, the ignition timing controlled by the vacuum advance-retardation mechanism 210 is as shown in FIG. 13(a) when the engine is operating at a high speed, while the ignition timing controlled by the vacuum advance-retardation mechanism 210 is as shown in FIG. 13(b) when the engine is operating at a low speed. Thus, it is understood that, when the solenoids 153 and 221 are energized, the ignition timing is greatly retarded when compared with that in the embodiment shown in FIG. 8.

In FIG. 13, the retardation "H" of the ignition timing is determined by the vacuum level produced in the vacuum chamber 214 on the retardation side (FIG. 12). This retardation of the ignition timing can be increased in accordance with the vacuum level produced in the vacuum chamber 214 on the retardation side by appropriately setting the spring force of a return spring 230 of the vacuum advance-retardation device 210.

As is mentioned above, in the embodiment shown in FIG. 12, since the ignition timing is greatly retarded when compared with that in the embodiment shown in FIG. 8, the advance of the ignition timing caused by the centrifugal-advance mechanism and the retardation of the ignition timing caused by the vacuum advance-retardation mechanism 210 can be cancelled by each other when the engine is operating at a high speed and under a light load. Consequently, when the throttle valve 136 is closed while the engine is operating at a high number of revolutions per minute as in the case wherein the vehicle is being decelerated, the ignition timing can be greatly retarded, thus preventing the occurrence of a misfire.

According to the present invention, when the engine is operating at a high speed and under a light load, the ignition timing can be retarded when compared with the conventional ignition timing, thus effectively preventing the occurrence of a misfire when the engine is operating at a high speed and under a light load.

While the invention has been described with reference to specific embodiments chosen for purposes of illustration, it should be apparent that numerous modifications could be made thereto by those skilled in the art without departing from the spirit and scope of the invention.

What is claimed is:

1. An ignition timing control device of an internal combustion engine for retarding the ignition timing when the speed of said engine is increased beyond a predetermined high number of revolutions per minute and when the load of said engine is lower than a predetermined light load, said engine having an intake passage, an air-fuel mixture-forming device disposed in said intake passage, said mixture-forming device comprising a two-barrel type carburetor having a secondary throttle valve and a secondary venturi located upstream of said secondary valve, a main combustion chamber, an auxiliary combustion chamber, a connecting passage communicating said main combustion chamber with said auxiliary combustion chamber, and a spark plug located in the region including the inside of said connecting passage and the insides of said main and auxiliary combustion chambers located near said connecting passage, said ignition timing control device comprising in combination;

- a distributor for feeding intermittent spark energy into said spark plug;
- a centrifugal-advance mechanism in said distributor for advancing the ignition timing in accordance with change in the number of revolutions of said engine, said centrifugal-advance mechanism comprising a governor cam and a governor weight which can cooperate with each other for retarding the ignition timing when the speed of said engine is increased beyond a predetermined high number of revolutions per minute;
- a vacuum-advance mechanism connected to said distributor and having a diaphragm apparatus with a vacuum chamber for advancing the ignition timing in accordance with change in the vacuum level in said vacuum chamber;
- a vacuum-advance mechanism control means for controlling the vacuum level in said vacuum chamber;
- said diaphragm apparatus of said vacuum-advance mechanism comprising a first diaphragm apparatus with a first vacuum chamber for advancing the ignition timing in accordance with an increase in the vacuum level in said intake passage, and a second diaphragm apparatus with a second vacuum chamber for advancing the ignition timing when the load of said engine is lower than a predetermined light load; and
- said vacuum-advance mechanism control means comprises a port opening into said secondary venturi and connected to said second vacuum chamber of said second diaphragm apparatus.

2. An ignition timing control device as claimed in claim 1, wherein said governor cam and said centrifugal weight have cam faces which are always in contact with each other and which are formed in such profiles that the ignition timing is retarded when the speed of said engine is increased beyond a predetermined high number of revolutions per minute.

* * * * *